(12) United States Patent
Hart (10) Patent No.: US 9,043,926 B2
(45) Date of Patent: May 26, 2015

(54) IDENTIFYING PRIMARILY MONOSEMOUS KEYWORDS TO INCLUDE IN KEYWORD LISTS FOR DETECTION OF DOMAIN-SPECIFIC LANGUAGE

(71) Applicant: Symantec Corporation, Mountain View, CA (US)

(72) Inventor: Michael Hart, Mountain View, CA (US)

(73) Assignee: Symantec Corporation, Mountain View, CA (US)

( * ) Notice: Subject to any disclaimer, the term of this patent is extended or adjusted under 35 U.S.C. 154(b) by 46 days.

(21) Appl. No.: 13/722,682

(22) Filed: Dec. 20, 2012

(65) Prior Publication Data

US 2014/0181983 A1    Jun. 26, 2014

(51) Int. Cl.
    *G06F 21/60* (2013.01)
(52) U.S. Cl.
    CPC .................................. *G06F 21/604* (2013.01)
(58) Field of Classification Search
    CPC .................................................... G06F 21/604
    USPC ............................................................. 726/26
    See application file for complete search history.

(56) References Cited

U.S. PATENT DOCUMENTS

| | | | | |
|---|---|---|---|---|
| 8,166,051 B1* | 4/2012 | Bauer et al. | ................... | 707/750 |
| 8,713,034 B1* | 4/2014 | Curtis et al. | ................... | 707/758 |
| 2004/0133418 A1* | 7/2004 | Turcato et al. | ................... | 704/9 |

OTHER PUBLICATIONS

Yarowsky, D. "Unsupervised Word Sense Disambiguation Rivaling Supervised Methods"; ACL '95 Proceedings of the 33rd annual meeting on Association for Computational Linguistics, 1995, pp. 189-196.

Fernandez-Amoros, D.; Heradio, R.; Cerrada, J.A.; Cerrada, C. "Automatic Word Sense Disabiguation using Co-occurrence and Hierarchical Information", Natural Language Processing and Information Systems; Lecture Notes in Computer Science vol. 6177, 2010, pp. 60-67.

* cited by examiner

*Primary Examiner* — Kambiz Zand
*Assistant Examiner* — Aubrey Wyszynski
(74) *Attorney, Agent, or Firm* — Patterson & Sheridan LLP (57) ABSTRACT

Techniques are described for generating a monosemous (i.e., single sense) keyword list associated with a particular domain (e.g., a medical or financial domain) for document classification. An input term frequency dictionary, a candidate keyword list, and a document corpus may be used to generate the keyword list. A collection of documents is divided into two sets, one related to a target domain and one not. A statistical approach may be used to evaluate each term in the candidate list to determine a measure of how monosemous each remaining candidate term is, i.e., how strongly the term (or short phrase) identifies with a single sense. Terms with a primarily single sense related to the target domain are added to the monosemous keyword list. The keyword list may be used to identify documents associated with the domain, allowing, the appropriate protections to be applied to the document (e.g., do not send outside an enterprise boundary or permit copying).

24 Claims, 6 Drawing Sheets

IDENTIFYING PRIMARILY MONOSEMOUS KEYWORDS TO INCLUDE IN KEYWORD LISTS FOR DETECTION OF DOMAIN-SPECIFIC LANGUAGE

BACKGROUND

1. Field

Embodiments of the invention generally relate to techniques for evaluating document content. More specifically, embodiments provide a method to identify a keyword list used to determine whether domain-specific language is used in a particular document.

2. Description of the Related Art

Data Loss Prevention (DLP) products provide software tools used to evaluate information shared across computer networks. For example, a DLP tool may be configured to evaluate the content of email messages to determine whether they should be blocked because they contain information that should not be shared outside of an enterprise. The DLP tool may use templates to evaluate content relative to a particular domain or standard. For example, a HIPAA template could flag a document as a potential violation if it is leaving the enterprise and contains both personally identifying information and medical terminology (e.g., drug, disease and medical procedure terms).

Frequently, a DLP tool may rely on a keyword list to determine whether a document or message is related to a particular topic or domain (or otherwise subject to a policy regarding dissemination, sharing, or access). If a document contains one or more terms from the keyword list, the document will be flagged (or blocked from being shared, etc). However, keeping a keyword list up to date is a significant challenge. Further, intelligently identifying keywords to include in a keyword lists is itself a difficult task. Such lists may be updated manually, but doing so is often labor intensive and time consuming (e.g., some datasets have over 100K terms entries). Further, it is often the case that the author of the list, who may or may not have medical expertise, will not fully be aware of all the possible meanings (e.g. senses) for a word. Resulting in words that, while having a sense related to the particular domain, may have other senses not related to that domain.

Another approach is to generate a keyword list. For example, medical terminology may be extracted from a coding standard, e.g., ICD-9-CM, a list of codes and descriptions published by the US government for coding medical interactions. However, if a potential keyword is used relatively infrequently in everyday language, it may not be specific to the domain of interest. Thus, relying on term frequencies alone can result in several poor choices such as "illegitimacy", "bovine", "symmetry", and "turpentine" along with good choices such as "abdominothoracocervical", "abdominouterine" and "abdominovenous," being selected as keywords. Terms such as "bovine" are infrequent, but not primarily related to medicine. More generally, simply generating a keyword list from an ontology or standard will result in a keyword list with terms that are indeed infrequent, but that do not have a meaning specific to that target domain (i.e., words having a single or at least primary "sense"—referred to as "monosemy".

SUMMARY

Embodiments presented herein include a method for generating a monosemous keyword list. This method may generally include receiving a first document corpus. Each document in the first document corpus is associated with a target domain which uses the monosemous keywords. This method also includes receiving a second document corpus. Unlike the first document corpus, each document in the second document corpus is unrelated to the target domain. This method also includes, for each of a plurality of candidate terms, determining a first frequency of usage of the candidate term within first document corpus, determining a second frequency of usage of the candidate term within second document corpus, and based on the first and second frequency of usage, determining whether the candidate term has a single sense associated with the target domain, and if so, adding the candidate term to the monosemous keyword list.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Embodiments presented herein generally relate to techniques for evaluating document or message content to prevent the unwanted or unintentional disclosure of confidential information. More specifically, embodiments provide a method to identify a monosemous keywords list used to determine whether domain-specific language is used in a particular document. Once identified, e.g., based on the use of a monosemous keyword in the keyword list, a policy can be applied to determine whether the document or message should be shared outside of an enterprise boundary or other specific action be allowed to occur, e.g., whether an email should be sent or quarantined to be reviewed for regulatory compliance. Because the evaluation of any given document or message may be limited to a keyword match, the list of keywords that trigger some data loss prevention (DLP) response need to be chosen carefully to avoid false positives. Further, language is constantly evolving, and words of limited use in one specific domain frequently obtain (or lose) senses or meanings over time. To address this issue, embodiments for generating a DLP keyword list disclosed below generate a DLP keyword list that can readily be used to update the DLP keyword list in order to remain current over time.

To generate a useful keyword list, in one embodiment, a DLP keyword generator takes as input a term frequency dictionary, a candidate keyword list, and a corpus (i.e., a collection of documents). The term frequency dictionary provides a sample of term frequencies determined by counting terms from a very large collection of documents used to be representative of a diverse usage of the target language (e.g., a collection of articles from on online encyclopedia).

The corpus may include a collection of documents in the targeted domain (e.g., for HIPAA, a subset of documents related to medicine). The collection of documents is divided into two sets, one related to a target domain and one not related to the target domain. In one embodiment, domain-specific documents in the corpus are identified by using very rare terms from a candidate keyword list. The very rare terms are presumed to be monosemous relative to the target domain. That is, words (or 2-3 word phrases) that are rarely used (e.g., less than once in 10 million) in general usage may be presumed to be monosemous (i.e., single sense). A document that contains a term from this subset of keywords is included in the related set. Otherwise, that document is assigned to the non-related set.

Alternatively, the related and unrelated document sets may be supplied to the DLP keyword generator. However, care must be taken to ensure that the relative ratio of documents related to the domain and documents unrelated to the domain matches the ratio of such documents generally. Doing so ensures the relative frequencies of term usage to be used to identify whether a given term (or short phrase) is monosemous. Identifying domain specific documents from a larger corpus of documents related to a broad subject matter may help preserve this ratio.

In one embodiment, the candidate keyword list is created as a collection of terms (or short 2-3 word phrases) from a domain specific ontology or index, e.g., the ICD-9 coding standard which provides a coding value for a broad variety of medical terms, procedures, diseases, symptoms, etc. for HIPAA enforcement. In a first step, the candidate keyword list goes through an initial filtering. In this step, terms that occur more frequently than a specified threshold are eliminated (e.g., for HIPAA, a term frequency of 1 in 500,000 has proven to be sufficient). In a second step, the DLP keyword generator determines a measure of how monosemous each remaining candidate term is, i.e., how strongly the term (or short phrase) identifies with a single sense.

To do so, for a given term T, the DLP keyword generator determines a document frequency (i.e., a count of documents containing the term) in both the related and non-related sets. In one embodiment, a statistical test may then be used to determine whether there is a significant difference in the frequency of the use of the term T in the related set and the non-related set (e.g., the chi-square test). If there is no difference, the term is deemed polysemous and excluded from the final DLP keyword list. If there is a significant difference, and the term is more likely to appear in the non-related set, then the term is deemed unrelated and polysemous (and excluded from the final DLP keyword list). If there is a significant difference and the term is more likely to appear in the related set, then term is deemed monosemous and included in the final DLP keyword list.

Once generated, a document or message may be evaluated whenever a user requests to perform certain actions, e.g., sending an email message, storing a document on a USB drive, or even simply accessing or printing the document or message. For example, an email client may include a plug-in which evaluates email message (and attachment) content against the final DLP keyword list. If a message includes any of the keywords on the DLP keyword list and also includes any other personally identifying information (e.g., a social security number or other patient identifier identified using a regular expression matching), than the message can be quarantined (or other action taken) to help ensure regulatory compliance. Of course, other actions could be taken. Further, the keywords found using embodiments described herein may be related to any target domain which uses a reasonable population of monosemous terms, and the example of HIPAA compliance and keywords related to medicine is used as a reference example.

In the following, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources. A user can access computing resources (e.g., applications, data, etc.) that reside in the cloud at any time, and from anywhere across the Internet.

In context of the present invention, a cloud-based system could be configured to periodically generate and update a keyword list supplied to client applications. Similarly, a web-based service could evaluate a request to send a message or document outside of an enterprise boundary and determine whether the message includes terms indicating that it is related to a particular domain or subject. Such a web service could also as authorize (or deny) the request to send the message when it includes terms indicating that it is related to the particular domain.

Further, embodiments of the invention are described below using a DLP keyword list generated using terms (and short phrases) derived using the ICD-9 coding standard as an example source for a candidate term list. The resulting keyword list may be used to identify documents related to medical treatments and/or procedures and diseases and/or illness diagnoses. Such a DLP tool may evaluate whether to restrict what actions may be taken with such a document or message which includes one of the DLP keywords (e.g., whether to allow a document/message to be sent to a recipient, copied to a USB drive or printed). Of course, one of ordinary skill in the art will recognize that embodiments of the invention may be adapted to provide keyword lists for a DLP tool used to identify documents relative to a broad variety of subject matter domains with an at least partial monosemous vocabulary. For example, in addition to HIPAA the DLP tool may help address regulatory compliance for specific legislation, e.g., CAN-SPAM, Sarbanes-Oxley, Gramm-Leach-Bliley, or templates used to identify particular behavior, e.g., to identify the use of inappropriate language, or for flagging documents with other specific monosemous terms (e.g., terms related to confidential research and development).

Figure 1:
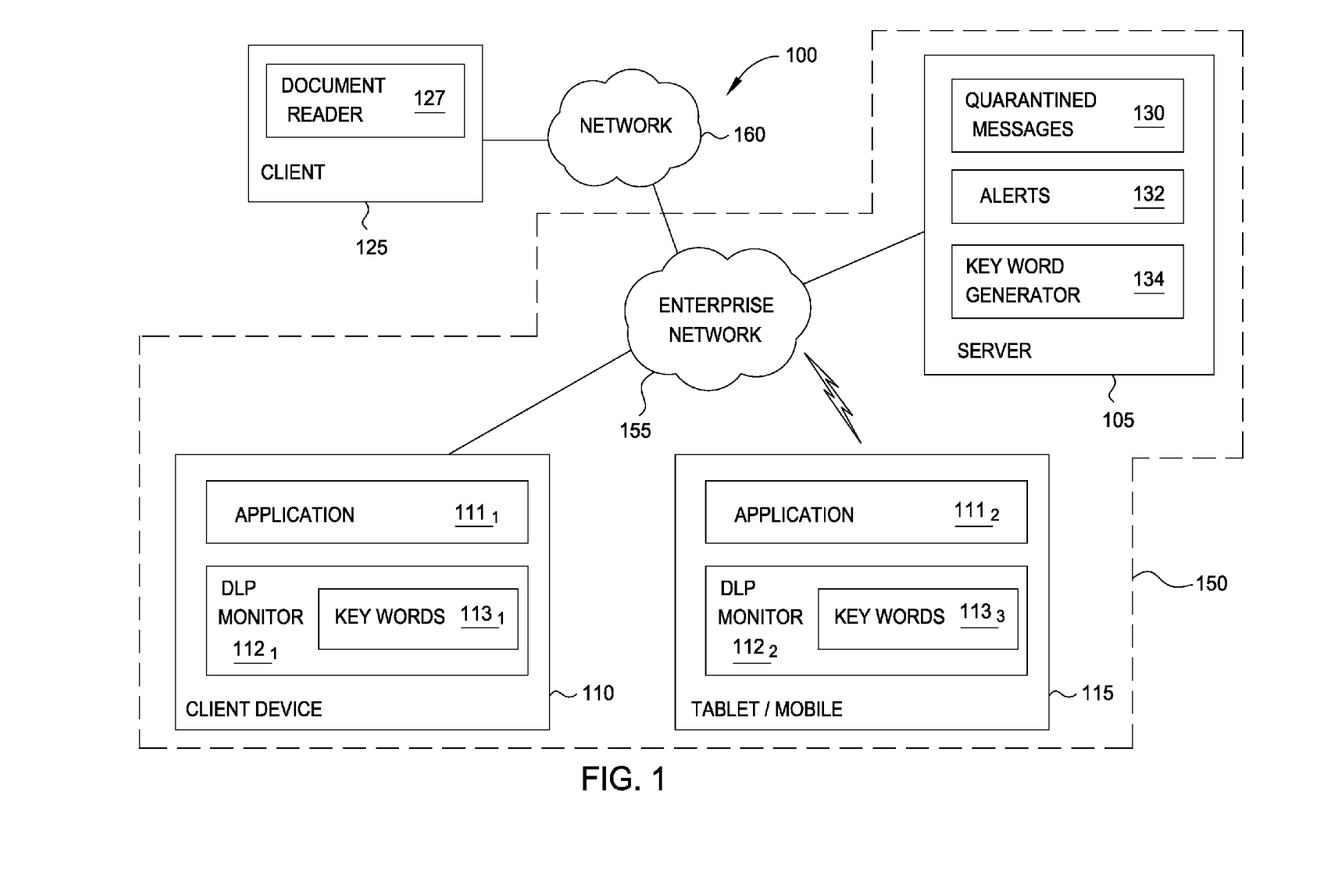
FIG. 1 illustrates an example computing environment, according to one embodiment.

FIG. 1 illustrates an example computing environment 100, according to one embodiment. As shown, a computing system 110, tablet/mobile device 115 and server 105 are each connected to an enterprise network 155 within an enterprise boundary 150. In addition, these computing systems may communicate outside of the enterprise, e.g., by sending messages to computing system 125 over external network 160 viewed using document reader 127. Note, computing device 110 and 125 generally correspond to computing systems such as a desktop or laptop computer. And tablet/mobile device 115 has been included to represent a handheld "smartphone" or computing tablet. Similarly, server computing system 105 provides a computing system used to provide services to clients 110 and 115. In the present context, the server 105 may provide a keyword generator 134 configured to generate and update keyword list $113_{1-2}$. As noted, list $113_{1-2}$ may be used to determine whether a given document or message is related to a particular domain or subject to a particular regulatory (or other policy) requirement.

As shown, the computing environment 100 provides a DLP monitor $112_{1-2}$ configured to evaluate certain actions undertaken using applications $111_{1-2}$ on computing system 110 or tablet/mobile device 115. For example, users may interact with applications $111_{1-2}$ to compose messages (e.g., email), edit a variety of documents such as word processing, spreadsheets, presentations, or specialized application files (e.g., a doctor's patient notes application) or otherwise create, edit, and view content that can be shared both inside and outside an enterprise boundary (represented using dashed line 150). When a document which includes one of the keywords $113_{1-2}$ is identified, the DLP monitor $112_{1-2}$ may generate an alert for the user of device 110, 115. Such alerts 132 may be logged on server 105. As another example, the DLP monitor 112 may send a document or message (e.g., an email message prior to being sent) to quarantined messages 130. Of course, the particular action taken when a document or message (or other content) is identified as being related to a particular domain based on the use of a monosemous keyword included in the keyword list 113 1-2 generated by keyword generator 134.

Figure 2:
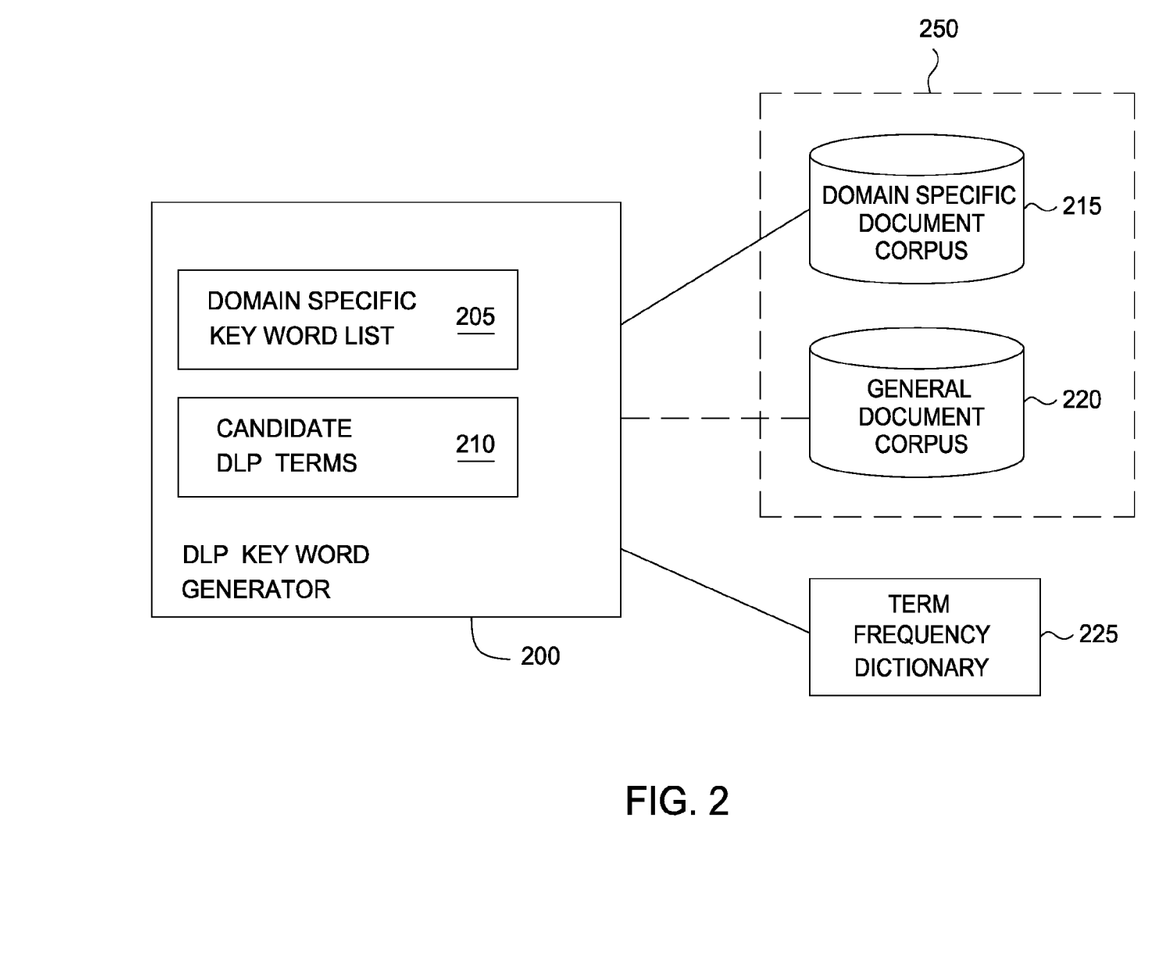
FIG. 2 illustrates example components for a DLP keyword generator, according to one embodiment.

FIG. 2 illustrates example components for a DLP keyword generator 200, according to one embodiment. As described below, the keyword generator 200 may uses a domain document corpus 215, general document corpus 220, and term frequency dictionary 225 to, first, generate a candidate list of DLP terms 210, and from the candidate list generate a domain specific keyword list. As noted, the domain specific keyword 205 list includes a set of infrequently used terms (or short phrases) that have a primarily single "sense," i.e., a set of monosemous keywords related to a target domain.

In one embodiment, two data sources are used to create the domain specific keyword list 205. First, a term frequency dictionary 225 is used to identify the relative prevalence of terms. Many term frequency dictionaries can be acquired or generated. For example, BYU's Contemporary Collection of American English (COCA) may be used. The second data source is a corpus of documents 250 used to create the domain specific document corpus 215 and general document corpus 220. Document corpus 250 may provide a collection of documents, some of which are related to the target domain (e.g., documents related to medicine). Note, the general percentage of domain-related documents in document corpus 250 can vary. However, having at least 1000 has proven to work well in practice to acquire a diversity of terms in the target domain.

In one embodiment, document corpus 250 can be articles from an encyclopedia, including, e.g., an online encyclopedia created from user-contributed content. Of course, the procuring document corpus 250 can come from a variety of sources.

However obtained, the document corpus 250 may be partitioned into domain specific document corpus 215 and general document corpus 220. The division of the corpus into the related and non-related sets is based on the assumption that substantially rare terms in the target domain such as "abdominothoracocervical" are expected to be monosemous. In one embodiment, the terms are identified by parsing an ontology or generating a list of candidate terms from a domain specific dictionary or standard.

The basis for this assumption is that polysemous words need to occur frequently enough to develop multiple senses and be employed by multiple speakers in different domains. In contrast, terms that occur with such infrequency are tied to the jargon of a specific domain. It should be noted that this technique is an approximation, and there is some tolerance for including domain-related documents in the non-related document set or include non-domain related document set. The cost of making a mistake in this classification step outweighs the cost of having to do a manual labeling, particularly for document sources with millions of documents and the requirement of expert classification.

Using medicine as an example, the keyword generator 200 may parse the ICD-9 coding standard and strip out key terms and (and phrases) to create candidate DLP terms 210. A variety of approaches may be used to find candidate monosemous words to include in list 210. One approach is to identify key terms and phrases for example with a frequency of use falling below a threshold. For example, both "xerothalmic scars" and be included as a two-word phrase. Similarly, "xerotlanlic" alone can be a term, while "scars" may be dropped—as not being infrequent enough to include in the candidate DLP terms 210. Note, in this example, the bigram "xerothalmic scars" can be dropped as the single word "xerothalmic" is adequate to capture all instances of the bigram. In other cases, however, bigrams (or trigrams etc.) may be included in the candidate DLP Terms list 210. For example, the bigram "California Disease" could be included as a candidate DLP keyword, where neither "California" nor "Disease" would be included.

Once the candidate list is generated, terms with an extremely low frequency of use may be used to identify documents from corpus 250 to include in the domain specific document corpus 215. Once documents from corpus 250 are divided into both domain specific document corpus 215 and general document corpus 220, the domain specific keyword list 205 may be created by evaluating the frequency of use in each term in the candidate DLP term list 210 within the domain document corpus 215 and general document corpus 220.

In one embodiment, a statistical test may be used to determine whether the frequency of use indicates a candidate term 210 is monosemous and related to the target domain, monosemous, but unrelated to the target domain, or polysemous. Terms determined to, at least statistically monosemous and related to the target domain are added to the domain specific keyword list 205. For example, the known Chi-square test may be used. The Chi-square test is appropriate test for this two-way comparison between two variables, "term seen" and "document source", allow the DLP keyword generator 200 to determine whether there is a significant difference between the term frequencies in the related and non-related sets, and by proxy, between documents within the domain and outside of the domain of interest.

Figure 3:
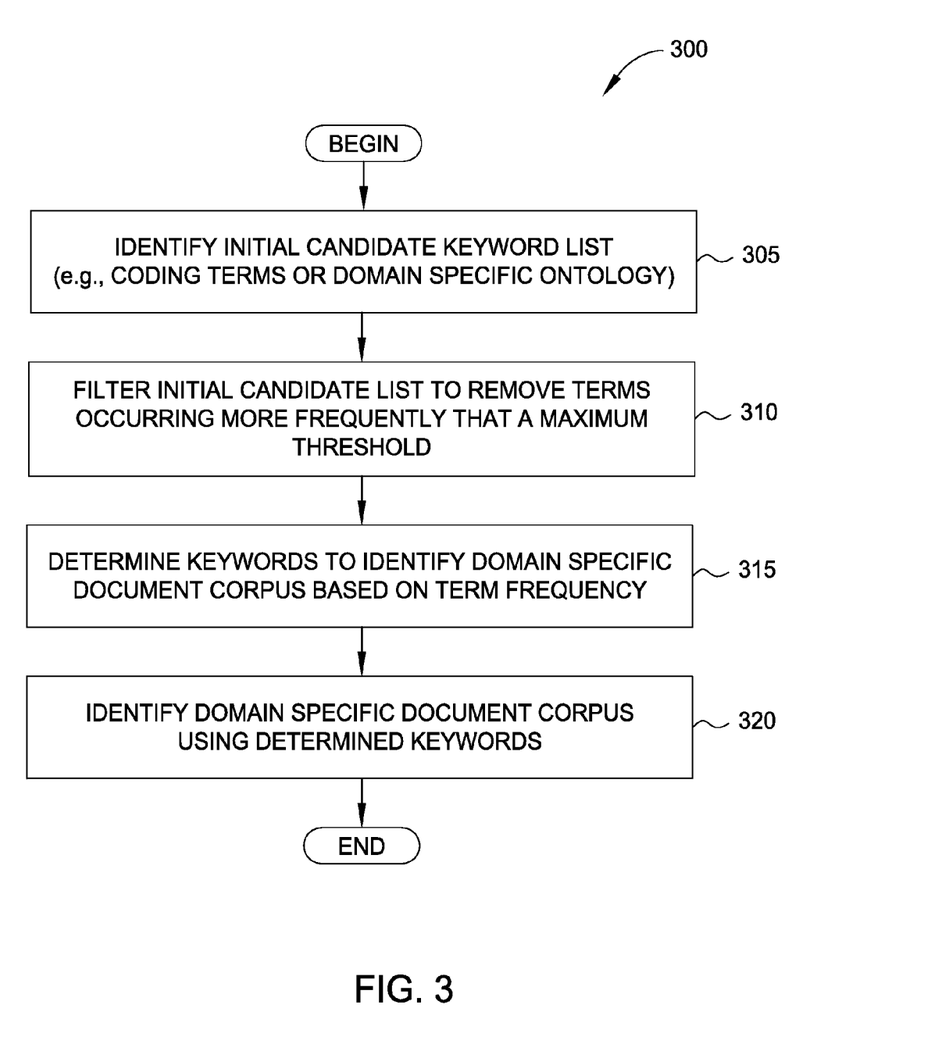
FIG. 3 illustrates a method for generating a generating a domain specific document collection, according to one embodiment.

FIG. 3 illustrates a method for generating a generating a domain specific document collection, according to one embodiment. That is, FIG. 3 illustrates a method for dividing a general document corpus 250 into the domain specific document corpus 215 and general document corpus 220.

As shown, the method 300 begins at step 305 where the individual candidate keyword list is created. While a variety of approaches may be used, in one embodiment, the DLP keyword generator 200 parses a domain specific term ontology or other domain specific resource (e.g., the ICD-9 coding standard) to identify a collection of terms and short phrases. At step 310, the initial candidate list generated at step 305 is filtered to remove candidates that occur more frequently than a maximum threshold. While the threshold may be tailored to suit a particular case, a term frequency of 1 in 500,000 has proven effective for terms derived from the ICD-9 coding standard. Filtering the candidate list in this manner removes terms that, based on a high frequently of use alone, are likely to be polysemous, as frequency of use tends to strongly correlate with a term having multiple senses.

At step 315, terms in the filtered candidate list with a very low frequency of use are identified. Again, while the threshold may be tailored to suit a particular case, a term frequency of 1 in 10,000,000 has proven effective to identify terms which may be presumed to be monosemous and related to the target domain. At step 320, the terms (and phrases) identified at step 315 are used to build the domain specific document corpus. For example, articles from an online encyclopedia are evaluated to identify articles which contain one of the terms identified at step 315. Such articles are added to the domain specific document corpus, while articles that do not include any of the terms identified at step 315 are added to the general document corpus. The process can continue to identify a minimum number of documents in the domain specific document corpus or until a minimum number of articles have been evaluated, or until some other criteria is satisfied. However, in practice building a domain specific document set with a at least 10,000 documents has proven to be effective.

Figure 4:
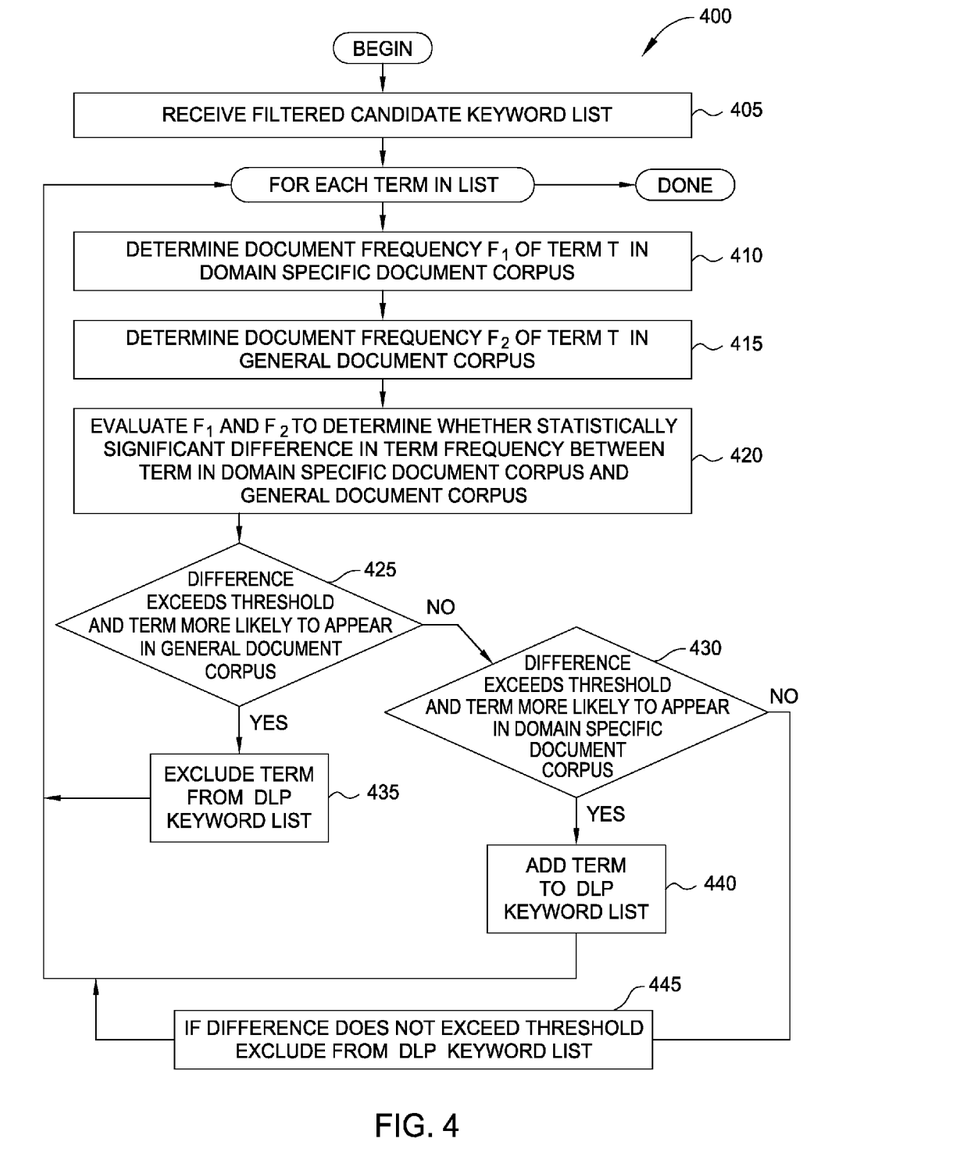
FIG. 4 illustrates a method for generating a DLP keyword list based on term frequency and term monosemy, according to one embodiment.

After building the candidate keyword list, domain specific document corpus, and general document corpus, the DLP keyword generator creates the final DLP keyword list from the candidate list created at step 305 and 310 of method 300. For example, FIG. 4 illustrates a method 400 for generating a DLP keyword list based on term frequency and term monosemy, according to one embodiment. As shown, the method 400 begins at step 405 where the DLP keyword generator receives the filtered candidate keyword list generated at step 305 and 310 of method 300. Thereafter, a loop begins to evaluate each term (or short phrase) in the filtered keyword list individually. At step 410 the keyword generator determines a document frequency ($F_1$) of a given term T in the domain specific document corpus. The frequency may be determined as the ratio of the number of documents in the domain specific document corpus which include the term to the total number of documents in the domain specific document corpus. At step 42, the keyword generator determines a document frequency ($F_2$) of the term T in the general document corpus. The frequency ($F_2$) may be determined as the ratio of the number of documents in the general document corpus to the total number of documents in the general document corpus.

At step 420 the relative frequencies F1 and F2 are evaluated to determine whether to include or exclude the term T from the final DLP keyword list. For example, in one embodiment, the Chi-square test may be used to evaluate whether the relative frequency of use of the Term T in the domain specific document corpus and the general document corpus is statistically significant. While the Chi-square test is well suited for this determination, other statistical methods may be used as well. For example, any significance test used specifically to compare proportions may be used. If difference in term frequency is statistically significant (based on the statistical test used to evaluate $F_1$ and $F_2$) and if the term is more likely to appear in the general document corpus, then at step 435 the term T is excluded from the DLP keyword list. This result occurs as the evaluation indicates that the term is primarily monosemous (i.e., single sense) but it has a sense that is not associated with the target domain (e.g., medicine). Otherwise, at step 430, if the difference in term frequency is statistically significant (again based on the statistical test used to evaluate $F_1$ and $F_2$) but the term is more likely to appear in the domain specific document corpus, then at step 440 the term T is added to the DLP keyword list. This result occurs as the evaluation that the term is substantially monosemous and has a sense associated with the target domain. Lastly, at step 445 if the difference in term frequency is not statistically significant, then the term T is considered polysemous. That is, the term T has a sense related to the target domain, but has other senses as well. In such a case, the term is excluded from the DLP keyword list. Following step 445, the DLP keyword generator proceeds to evaluate another term T from the candidate list until all terms have been evaluated.

Figure 5:
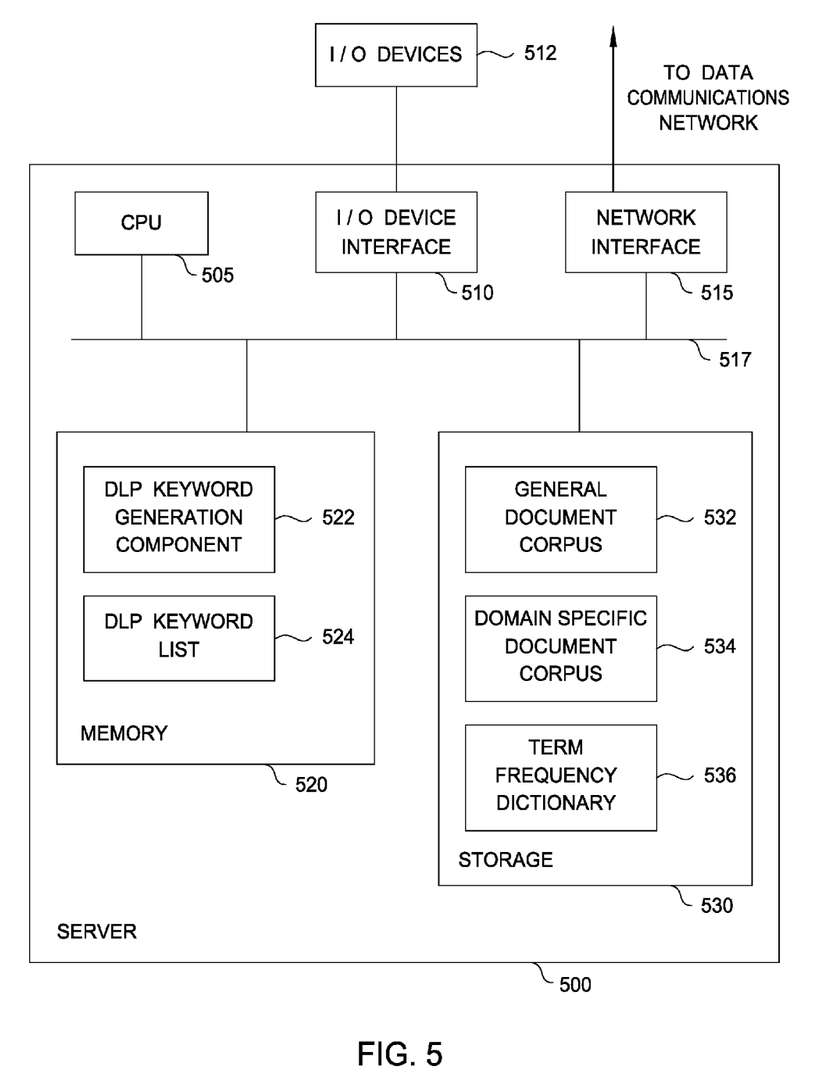
FIG. 5 illustrates an example client computing system configured with a DLP tool, according to one embodiment.

FIG. 5 illustrates an example computing system configured with software used to generate a DLP keyword list, according to one embodiment. As shown, the computing system 500 includes, without limitation, a central processing unit (CPU) 505, a network interface 515, a memory 520, and storage 530, each connected to a bus 517. The computing system 500 may also include an I/O device interface 510 connecting I/O devices 512 (e.g., keyboard, display and mouse devices) to the computing system 500. Further, in context of this disclosure, the computing elements shown in computing system 500 may correspond to a physical computing system (e.g., a system in a data center) or may be a virtual computing instance executing within a computing cloud.

The CPU 505 retrieves and executes programming instructions stored in the memory 520 as well as stores and retrieves application data residing in the memory 530. The interconnect 517 is used to transmit programming instructions and application data between the CPU 505, I/O devices interface 510, storage 530, network interface 515, and memory 520. Note, CPU 505 is included to be representative of a single CPU, multiple CPUs, a single CPU having multiple processing cores, and the like. And the memory 520 is generally included to be representative of a random access memory. The storage 530 may be a disk drive storage device. Although shown as a single unit, the storage 530 may be a combination of fixed and/or removable storage devices, such as fixed disc drives, removable memory cards, or optical storage, network attached storage (NAS), or a storage area-network (SAN).

Illustratively, the memory 520 includes DLP keyword generation component 522 and a DLP keyword list 524, and the storage 530 a general document corpus 532, a domain specific document corpus 534 and a term frequency dictionary 536. As described above the DLP keyword generator 522 is generally configured to build (and update) the DLP keyword list 524. To do so, the keyword generator 524 receives a candidate list of keywords (e.g., derived using the method 300 shown in FIG. 3). The relative frequency of each such term in the general document corpus 532 and domain specific document corpus 534 is evaluated to indentify which terms are substantially monosemous (i.e., single sense) and associated with the target domain, as represented by the domain specific document corpus 534. The resulting list of keywords may then be used by a DLP monitoring tool on a client application to identify documents or messages that are associated with the target domain.

Figure 6:
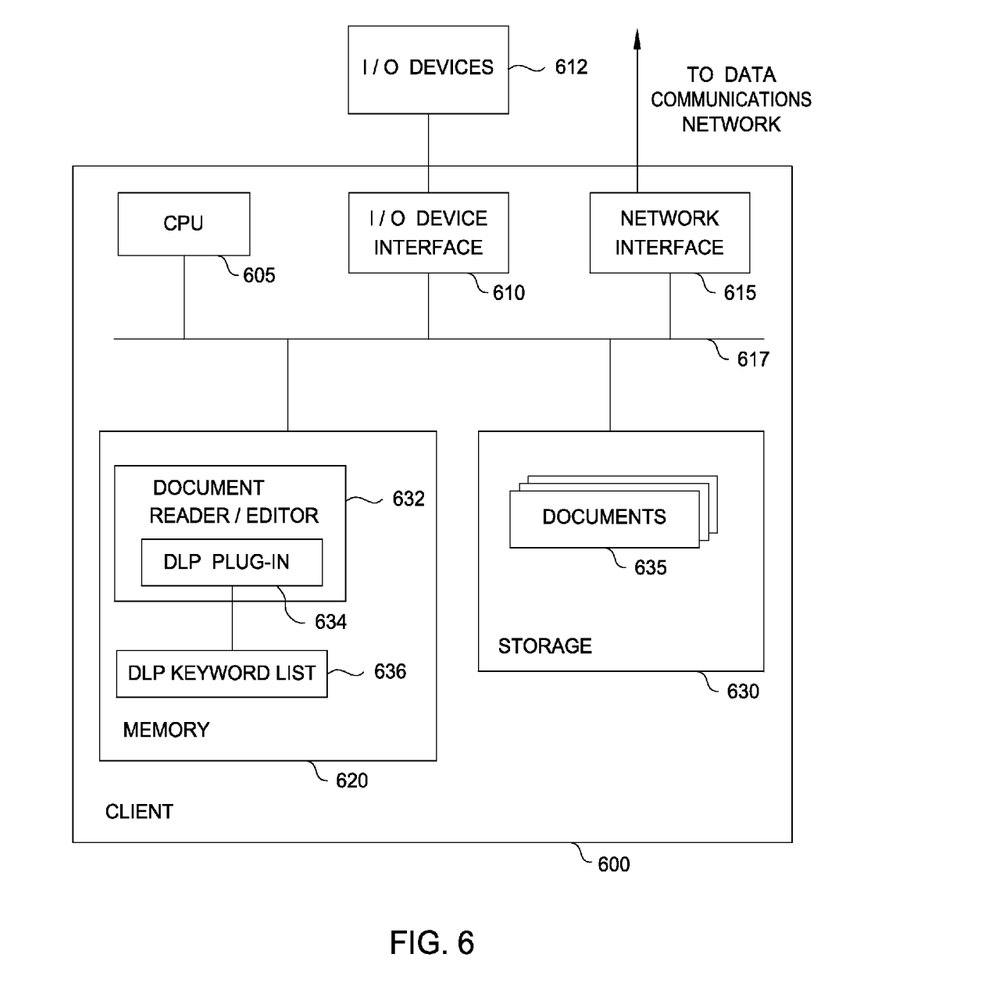
FIG. 6 illustrates an example computing system configured with software used to generate a DLP keyword list, according to one embodiment.

For example, FIG. 6 illustrates an example client computing system 600 configured with a DLP tool, according to one embodiment. As shown, the computing system 600 includes, without limitation, a central processing unit (CPU) 605, a network interface 615, a memory 620, and storage 630, each connected to a bus 617. The computing system 600 may also include an I/O device interface 610 connecting I/O devices 612 (e.g., keyboard, display and mouse devices) to the computing system 600. Further, in context of this disclosure, the computing elements shown in FIG. 6 generally represent a computing system accessed by an end user within an enterprise in creating, editing, reviewing, and otherwise working with information that may be subject to a policy regarding dissemination or access. And further, where a DLP monitoring tool may determine whether a given document is related to a given topic or subject matter based on the presence (or absence) of keywords from a keyword list generated using the techniques described above.

Like the computing system 500 shown in FIG. 5, CPU 605 retrieves and executes programming instructions stored in the memory 620 as well as stores and retrieves application data residing in the memory 630. The interconnect 617 is used to transmit programming instructions and application data between the CPU 605, I/O devices interface 610, storage 630, network interface 615, and memory 620. Note, CPU 605 is included to be representative of a single CPU, multiple CPUs, a single CPU having multiple processing cores, and the like. And the memory 620 is generally included to be representative of a random access memory. Examples of storage 630 include a magnetic disk drive and solid state storage devices.

Illustratively, the memory 620 includes a document reader/editor 632, DLP plug in 634, and DLP keyword list 636. And the storage 630 includes document collection 635. The document reader/editor 632 is included to be representative of a broad variety of software applications used to create, edit, and share electronic documents and messages. For example, the document reader/editor could be an email client. In such a case, the DLP plug-in 634 could be configured to evaluate email messages and documents 635 attached to email messages for the presence of a keyword from the DLP keyword list. Because the keyword matching is not computationally intense, it may be done quickly. As a result, the DLP plug-in 634 will not introduce unacceptable latency in the process for sending an email (or for evaluating documents or messages in other contexts). Further, because the DLP keyword list 636 includes terms determined to have a single sense, i.e., a single monosemous meaning, related to the target domain of interest, the keyword matching is very accurate at identifying documents related to a target domain, based on the presence of a word with a sense or meaning used within the target domain, the DLP plug-in tool should not block a messages from being sent (or take other action).

As described above, a monosemous keyword list associated with a particular domain (e.g., a medical or financial domain) may be generated. Each monosemous keyword has a single word sense associated with the particular domain. To generate the keyword list, a DLP keyword generator takes as input a term frequency dictionary, a candidate keyword list, and a document corpus. The collection of documents is divided into two sets, one related to a target domain and one not related to the target domain. The DLP keyword may use a statistical approach to evaluate each term in the candidate list to determine a measure of how monosemous each remaining candidate term is, i.e., how strongly the term (or short phrase) identifies with a single sense. Terms which exhibit a primarily single sense related to the target domain are added to the monosemous keyword list.

While the foregoing is directed to embodiments of the present invention, other and further embodiments of the invention may be devised without departing from the basic scope thereof, and the scope thereof is determined by the claims that follow.

What is claimed is:

1. A method for generating a monosemous keyword list, the method comprising:
   receiving a first document corpus, wherein each document in the first document corpus is associated with a target domain;
   receiving a second document corpus, wherein each document in the second document corpus is unrelated to the target domain;
   for each of a plurality of candidate terms:
      determining a first frequency of usage of the candidate term within first document corpus,
      determining a second frequency of usage of the candidate term within second document corpus,
      based on the first and second frequency of usage, determining whether the candidate term has a single sense associated with the target domain, and
      if so, adding the candidate term to the monosemous keyword list.

2. The method of claim 1, wherein the plurality of candidate terms is derived from a domain specific ontology of keywords related to the target domain.

3. The method of claim 1, wherein the plurality of candidate terms is derived from a coding standard assigning code values to specific terms.

4. The method of claim 1, wherein at least a first one of the plurality of candidate terms includes a bigram phrase.

5. The method of claim 1, wherein determining whether the candidate term has a single sense associated with the target domain comprises performing a statistical evaluation of the first frequency of usage, the second frequency of usage, a count of documents in the first document corpus and a count of documents in the second document corpus.

6. The method of claim 5, wherein the statistical evaluation is the Chi-Square test.

7. The method of claim 1, wherein the first document corpus is determined by identifying documents using a one of a plurality of terms associated with the target domain having a frequency of use below a minimum threshold.

8. The method of claim 1, further comprising, providing the monosemous keyword list to a client device, wherein the client device is configured to identify a document as being associated with the target domain based on the use of at least a first one of the monosemous keywords in the document.

9. A non-transitory computer-readable storage medium storing instructions, which, when executed on a processor, performs an operation for generating a monosemous keyword list, the operation comprising:
   receiving a first document corpus, wherein each document in the first document corpus is associated with a target domain;
   receiving a second document corpus, wherein each document in the second document corpus is unrelated to the target domain;
   for each of a plurality of candidate terms:
      determining a first frequency of usage of the candidate term within first document corpus,
      determining a second frequency of usage of the candidate term within second document corpus,
      based on the first and second frequency of usage, determining whether the candidate term has a single sense associated with the target domain, and
      if so, adding the candidate term to the monosemous keyword list.

10. The non-transitory computer-readable storage medium of claim 9, wherein the plurality of candidate terms is derived from a domain specific ontology of keywords related to the target domain.

11. The non-transitory computer-readable storage medium of claim 9, wherein the plurality of candidate terms is derived from a coding standard assigning code values to specific terms.

12. The non-transitory computer-readable storage medium of claim 9, wherein at least a first one of the plurality of candidate terms includes a bigram phrase.

13. The non-transitory computer-readable storage medium of claim 9, wherein determining whether the candidate term has a single sense associated with the target domain comprises performing a statistical evaluation of the first frequency of usage, the second frequency of usage, a count of documents in the first document corpus and a count of documents in the second document corpus.

14. The non-transitory computer-readable storage medium of claim 13, wherein the statistical evaluation is the Chi-square test.

15. The non-transitory computer-readable storage medium of claim 9, wherein the first document corpus is determined by identifying documents using a one of a plurality of terms associated with the target domain having a frequency of use below a minimum threshold.

16. The non-transitory computer-readable storage medium of claim 9, wherein the operation further comprises, providing the monosemous keyword list to a client device, wherein the client device is configured to identify a document as being associated with the target domain based on the use of at least a first one of the monosemous keywords in the document.

17. A system, comprising:
   a processor and
   a memory hosting an application, which, when executed on the processor, performs an operation computer-readable storage medium, the operation comprising:
      receiving a second document corpus, wherein each document in the second document corpus is unrelated to the target domain;
      for each of a plurality of candidate terms:
         determining a first frequency of usage of the candidate term within first document corpus,
         determining a second frequency of usage of the candidate term within second document corpus,
         based on the first and second frequency of usage, determining whether the candidate term has a single sense associated with the target domain, and
         if so, adding the candidate term to the monosemous keyword list.

18. The system of claim 17, wherein the plurality of candidate terms is derived from a domain specific ontology of keywords related to the target domain.

19. The system of claim 17, wherein the plurality of candidate terms is derived from a coding standard assigning code values to specific terms.

20. The system of claim 17, wherein at least a first one of the plurality of candidate terms includes a bigram phrase.

21. The system of claim 17, wherein determining whether the candidate term has a single sense associated with the target domain comprises performing a statistical evaluation of the first frequency of usage, the second frequency of usage, a count of documents in the first document corpus and a count of documents in the second document corpus.

22. The system of claim 21, wherein the statistical evaluation is the Chi-square test.

23. The system of claim 17, wherein the first document corpus is determined by identifying documents using a one of a plurality of terms associated with the target domain having a frequency of use below a minimum threshold.

24. The system of claim 17, wherein the operation further comprises, providing the monosemous keyword list to a client device, wherein the client device is configured to identify a document as being associated with the target domain based on the use of at least a first one of the monosemous keywords in the document.

* * * * *